(No Model.)

J. O. TAYLOR.
BICYCLE HOLDER AND LOCK.

No. 533,755. Patented Feb. 5, 1895.

WITNESSES:
John A Bergstrom
Theo. G. Hoster

INVENTOR
J. O. Taylor
BY Munn & Co
ATTORNEYS.

United States Patent Office.

JAMES OSTRAM TAYLOR, OF BROOKLYN, NEW YORK.

BICYCLE HOLDER AND LOCK.

SPECIFICATION forming part of Letters Patent No. 533,755, dated February 5, 1895.

Application filed October 1, 1894. Serial No. 524,633. (No model.)

*To all whom it may concern:*

Be it known that I, JAMES OSTRAM TAYLOR, of Brooklyn, in the county of Kings and State of New York, have invented a new and Improved Bicycle Holder and Lock, of which the following is a full, clear, and exact description.

The object of the invention is to provide a new and improved bicycle holder and lock, designed to hold the front wheel in position to prevent it from swinging sidewise, and to consequently lock the wheel to the frame.

The invention consists principally of an arm mounted to swing from and in alignment with the bicycle frame, the said arm being adapted to engage with its free end the rim of the bicycle wheel.

The invention also consists of certain parts and details and combinations of the same, as will be fully described hereinafter and then pointed out in the claim.

Reference is to be had to the accompanying drawings, forming a part of this specification, in which similar letters of reference indicate corresponding parts in all the figures.

Figure 1:
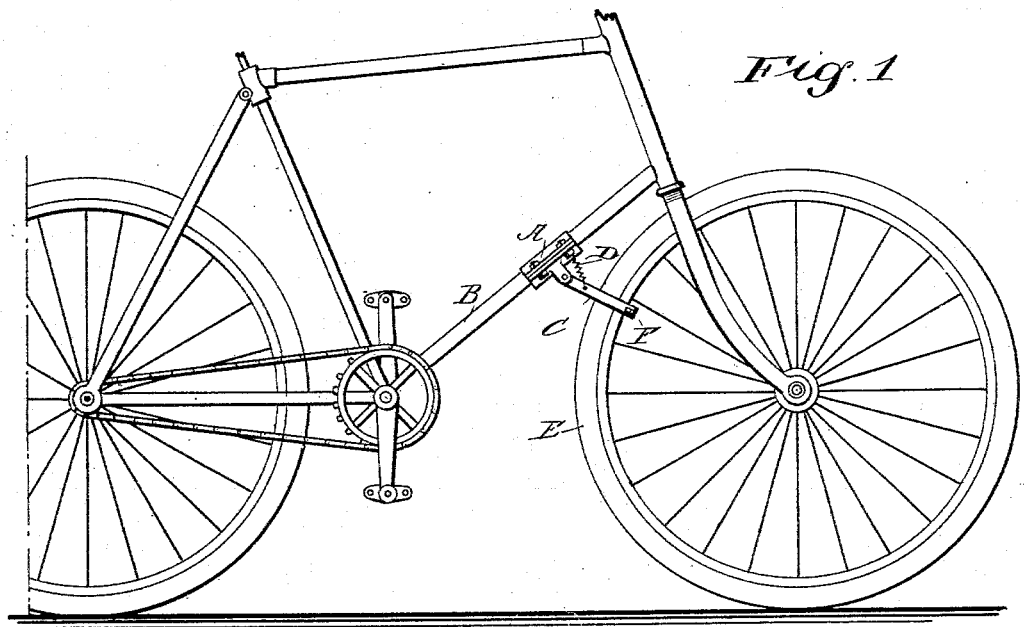
Figure 2:
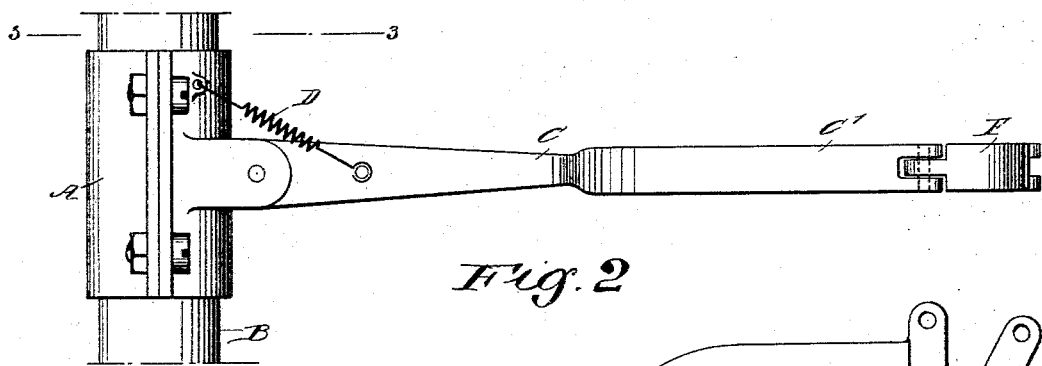
Figure 3:
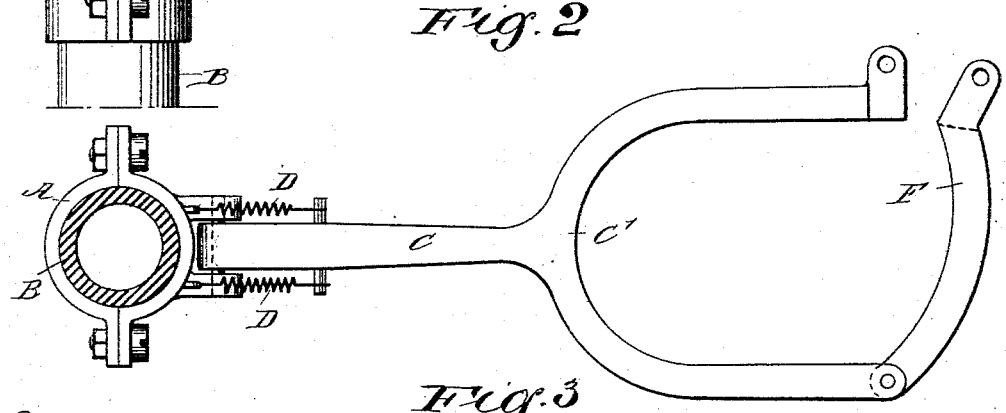

Figure 1 is a side elevation of the improvement as applied. Fig. 1 is an enlarged side elevation of the improvement; and Fig. 3 is a sectional plan view of the same, on the line 3—3 of Fig. 2.

The improved bicycle holder and lock is provided with a suitably constructed clamp A adapted to be fastened to the bar B of the bicycle frame, as indicated in Fig. 1. On the clamp A is pivoted an arm C, mounted to swing in alignment with the bicycle frame, the said arm being normally held against the bar B by a spring or springs D connecting the arm with the clamp A, as illustrated in the drawings.

The free end of the arm C is formed with a fork C' adapted to straddle the rim of the bicycle wheel E at the time the said arm C is swung from its resting position, into the position shown in Fig. 1. The free ends of the fork C' are adapted to be connected with each other by a lock bar F, pivoted on one of the fork members and having at its other end bifurcations to embrace and adapted to be fastened to the end of the other fork member by a lock of any approved construction passing through registering perforations in said member and in the bifurcations of the locking bar. It is understood that this lock bar F extends transversely on the outside of the rim of the wheel E between two spokes so that the wheel cannot be turned, and consequently unauthorized persons cannot make use of the wheel, at the time the said front wheel is locked as described. It will further be seen that in order to engage the fork C' of the arm C with the rim of the wheel E, it is necessary that the latter stand in alignment with the arm C, the frame B and said wheel, to permit of swinging the arm C in position, to cause its fork C' to straddle the rim of the wheel E. When this is done, the bar F is closed and locked in position, as above described.

Now, it will be seen that as the arm C has but a swinging motion in alignment with the frame B, the wheel E is prevented from turning sidewise, its fork turning in the head of the bicycle frame, as is frequently the case when a wheel is run up along the curb or other convenient place at the time the rider dismounts.

Having thus fully described my invention, I claim as new and desire to secure by Letters Patent—

A bicycle holder and lock comprising a clamp adapted to be secured to the frame, a spring actuated arm pivoted to the clamp and adapted to swing in alignment therewith, said arm having forks formed at its free end and a locking bar pivoted to one of the forks at one end and having at its other end bifurcations adapted to embrace the other fork, said bifurcations and the fork embraced thereby being formed with registering perforations, substantially as set forth.

JAMES OSTRAM TAYLOR.

Witnesses:
THEO. G. HOSTER,
C. SEDGWICK.